United States Patent
Jo

(10) Patent No.: US 9,334,848 B2
(45) Date of Patent: May 10, 2016

(54) WAVE GENERATOR

(76) Inventor: Chang-Hui Jo, Goyang-si (KR)

(*) Notice: Subject to any disclaimer, the term of this patent is extended or adjusted under 35 U.S.C. 154(b) by 406 days.

(21) Appl. No.: 13/880,144

(22) PCT Filed: Oct. 13, 2011

(86) PCT No.: PCT/KR2011/007615
§ 371 (c)(1),
(2), (4) Date: Apr. 18, 2013

(87) PCT Pub. No.: WO2012/053769
PCT Pub. Date: Apr. 26, 2012

(65) Prior Publication Data
US 2013/0207398 A1    Aug. 15, 2013

(30) Foreign Application Priority Data

Oct. 18, 2010 (KR) .................. 10-2010-0101375

(51) Int. Cl.
*F03B 13/22* (2006.01)
*F03B 13/20* (2006.01)

(52) U.S. Cl.
CPC .............. *F03B 13/22* (2013.01); *F03B 13/20* (2013.01); *Y02E 10/38* (2013.01)

(58) Field of Classification Search
CPC ........ F03B 13/14; F03B 13/142; F03B 13/20; F03B 13/22
See application file for complete search history.

(56) References Cited

U.S. PATENT DOCUMENTS

| | | | | |
|---|---|---|---|---|
| 3,187,691 A * | 6/1965 | Leitzel | .......................... | 108/53.3 |
| 4,203,294 A * | 5/1980 | Budal et al. | ..................... | 60/497 |
| 4,207,739 A | 6/1980 | Scarpi | | |
| 4,279,569 A * | 7/1981 | Harloff | .......................... | 415/53.3 |
| 4,573,869 A * | 3/1986 | Kitamoto | ..................... | 415/211.1 |
| 4,691,513 A * | 9/1987 | Gillilan | .......................... | 60/495 |
| 5,051,059 A * | 9/1991 | Rademacher | ..................... | 415/7 |
| 7,329,961 B2 * | 2/2008 | Marchetti | ....................... | 290/54 |
| 7,744,338 B2 * | 6/2010 | DeRuyter et al. | .............. | 415/2.1 |
| 8,933,573 B2 * | 1/2015 | Jo | .................. | 290/53 |
| 2011/0175359 A1 * | 7/2011 | Patten | ........................ | 290/53 |

FOREIGN PATENT DOCUMENTS

| | | |
|---|---|---|
| JP | 58-067969 | 4/1983 |
| JP | 58-067970 | 4/1983 |
| JP | 2001-193626 | 7/2001 |
| JP | 2003-307172 | 10/2003 |
| KR | 10-2005-0065475 | 6/2009 |
| WO | WO 93/15315 | 8/1993 |

* cited by examiner

*Primary Examiner* — Troy Chambers
*Assistant Examiner* — Joshua Semick
(74) *Attorney, Agent, or Firm* — NSIP Law

(57) ABSTRACT

A wave power generator is provided, and, more particularly, a wave power generator, which has a simple structure leading to improved cost efficiency and high energy conversion rate and is able to be installed in anywhere, so that practicality and a value of wave as a clean energy resource may be enhanced, is provided. The wave power generator includes a raft vessel configured to be in a shape of disk and filled with water; a water turbine configured to be installed on a central axis of the raft vessel; and a mooring chain configured to be connected to the raft vessel to thereby determine a location where the raft vessel is to float.

3 Claims, 5 Drawing Sheets

WAVE GENERATOR

CROSS-REFERENCE TO RELATED APPLICATION

This application is a continuation of International Patent Application No. PCT/KR2011/007615, filed on Oct. 13, 2011, which claims priority to and the benefit of Korean Patent Application No. 10-2010-0101375, filed on Oct. 18, 2010, the disclosure of which is incorporated herein by reference in its entirety.

TECHNICAL FIELD

The present invention relates to a wave power generator, and, more particularly, to a wave power generator which has a simple structure leading to high cost-efficiency and a great energy conversion rate and is able to be installed in anywhere, so that practicality and a value of wave as a clean energy resource will improve.

BACKGROUND ART

Our future is being threatened by exhaustion of fossil fuel resources, increasing cost pressure of energy due to reduced production and cost advancing pressure from oil-producing countries, and serious environmental pollution coming out from energy consumption.

In addition, conventional power generation system using fossil fuels, there are various power generation systems using various kinds of energy resources such as nuclear energy, tidal energy, water energy, wave energy, solar energy, bio energy, and so on.

However, nuclear energy even having economic feasibility has been restrictively developed only in some countries due to the Nuclear Nonproliferation Treaty and radioactive contamination, meanwhile water energy and tidal energy require proper site location satisfying system requirements, anticipated excessive investment and long-term construction period, while solar energy and wave energy require storage cell due to intermittent generation and higher cost.

Accordingly, development of wave power generation system using clean energy is still needed.

Considering those systems consuming fossil fuels, future-oriented new power generation systems using clean energy resources must be competitive in construction costs and operation cost to the conventional electric power systems including land occupations, anticipative investments, construction periods, social costs from environmental pollution, and so on. In addition, the wave power generation system must have high annual operation rate and be free from expensive storage equipment or auxiliary power generation.

Meanwhile, since water having heavier mass has higher kinetic energy than air having lighter mass, the technology converting kinetic energy of moving seawater, i.e., research of generating electricity from wave power, is now in the process.

In particular, considering that most countries have long coastal lines faced to ocean, energy resources from sea wave are out of count. However, frequency and wave power in near shore and offshore have high fluctuations according to environment of the locations and seasons, whereas relatively lower wave height often occurs according to season's weather condition.

Accordingly, if the disadvantage of practice caused by lower wave height and uneven wave period could be overcome, uncountable wave power will be secured at no cost.

Technologies of converting wave power into energy have been opened already as an oscillating water column type, a movable body type, a raft conversion type, a shoulder cam type, an energy amplification and concentration type, wave overtopping type, etc.

The oscillating water column type is most commonly used, but has a number of drawbacks. For example, the oscillating water column type takes long time to construct a large-scale bottom structure and uses inefficient air turbine, leading to cost ineffectiveness and necessarily changing output power due to a change in air pressure. In the case of the raft conversion type, an oil pressure pump with relatively short strokes is cost-ineffective and considered unsafe, so that it garners less interest. Both the oscillating water column type and the raft conversion type are available to generate power only when a wave height reaches a certain level. In addition, both of them are not efficient in energy conversion, and are adapted in a small range of usable wave.

As a raft is the most adequate medium to convert wave energy into useful energy, using mass movement of the raft, so that the raft conversion type may be the most promising method to generate power using wave energy. However, there are still many issues blocking the development of the raft conversion type, including low efficiency of the conversion type, fluctuation of seasonal output power, concerns over stability against an abnormal wave and a gap in expenses between wave power generation and fossil-fuel power generation. Therefore, more researches and development need to be done to address the above troubling problems.

It is true that a wave power generator is superior to other power generators, but, if the wave power generator has a complex structure, for example, requiring a great number of raft vessels and a complicated way of connecting the raft vessels to each other, it may not be cost-effective. For this reason, a new wave power generator, which has a simple structure leading to high energy conversion efficiency and is able to be installed in anywhere, is needed.

Technical Problem

The present invention is designed to provide a wave power generator which has a simple structure leading to improved cost efficiency and a high energy conversion rate and is able to be installed in anywhere, so that practicality and a value of wave as a clean energy resource may be enhanced.

Technical Solution

The present invention provides a wave power generator including: a raft vessel configured to be in a shape of disk and filled with water; a water turbine configured to be installed on a central axis of the raft vessel; and a mooring chain configured to be connected to the raft vessel to thereby determine a location where the raft vessel is to float.

The water turbine may be a cross-flow water turbine as shaped as a sirocco fan.

The above water turbine may include blades arranged therein, and each blade is curved and tilted relative to a central rotational shaft of the water turbine at a predetermined angle.

The wave power generator may further comprise a plurality of partitions configured to be arranged around the central rotational shaft of the water turbine along a circumference to thereby form a plurality of chambers and induce a flow of the water to a center of the raft vessel.

The plurality of partitions may form air chambers, each air chamber having a closed upper surface and an open bottom surface.

A width and/or radius of the raft vessel may be half a designed wave length, and a height of the raft vessel may be twice a designed wave height.

Additional features of the invention will be set forth in the description which follows, and in part will be apparent from the description, or may be learned by practice of the invention.

Advantageous Effects

A wave power generator according to the present invention has a simple structure leading to improved cost efficiency and high energy conversion rate, and is able to be installed in anywhere, so that practicality and a value of wave as a clean energy resource may be enhanced.

DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

BEST MODE

Figure 1:
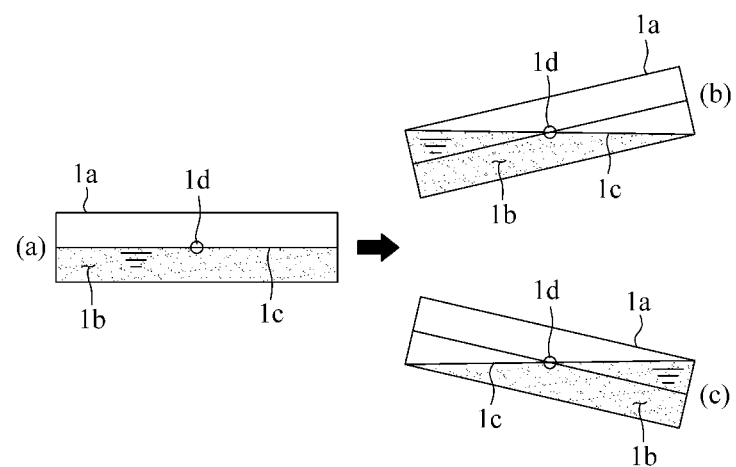
FIG. 1 is a diagram illustrating a wave power generator working principle according to an exemplary embodiment of the present invention.

The present invention discloses a wave power generator characterized by including a raft vessel which is in the shape of disk and is filled with water, a water turbine installed on a central axis of the raft vessel, and a mooring chain configured to be connected to the raft vessel to thereby determine a location where the raft vessel is to float.

Mode For Invention

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, preferred embodiments of the present invention will be described with reference to following drawings.

FIG. 1 is a diagram illustrating a wave power generator working principle according to an exemplary embodiment of the present invention.

The following is a wave power generator working principle according to an exemplary embodiment of the present invention, with reference to FIG. 1. For example, if a predetermined long container $1a$ is filled with water $1b$ to half the height of the container $1a$, and is tipped downward to the left (b) or the right (c), the water $1b$ flows downward to the left or right according to the inclination of the container $1a$. After the tipping movement of the container $1a$, the surface $1c$ of the water $1b$ is horizontally balanced.

If the container $1a$ is tipped downward from the left (b) to the right (c), or from the right (c) to the left (b), the water $1b$ moves toward the opposite edge of the container $1a$ and a water level of each edge of the container $1a$ changes according to a direction in which the container $1a$ is tipped downward. However, a constant water level is maintained at the center of the container $1a$.

Accordingly, the water $1b$ in the container $1a$ flows from one edge to the other edge with the center $1d$ between the edges, according to the inclination of the container $1a$.

Figure 2:
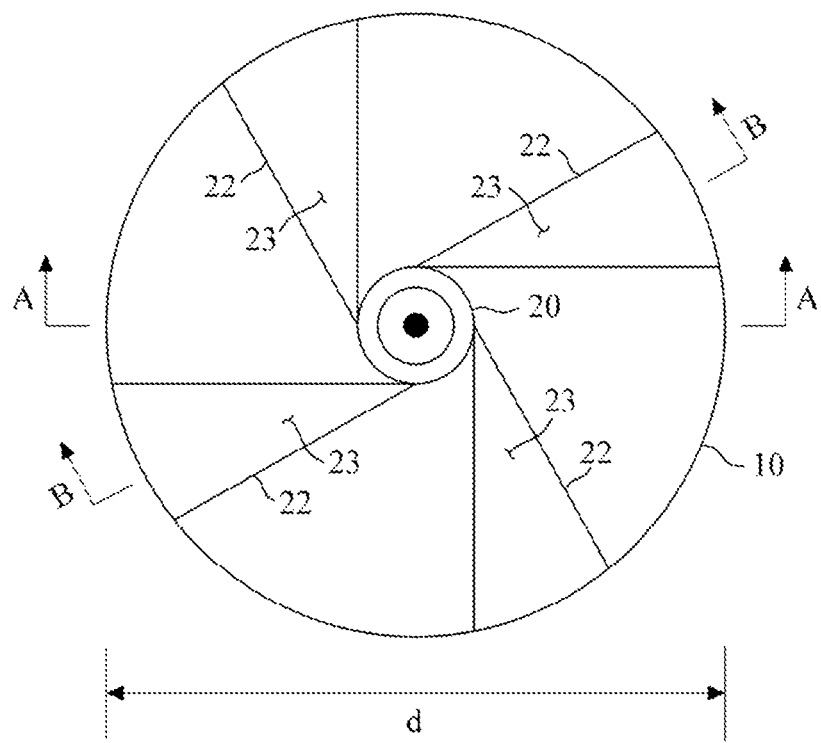
FIG. 2 is a diagram illustrating a planar structure of a raft vessel included in a wave power generator according to an exemplary embodiment of the present invention.

Given the water turbine working principle described above in FIG. 1, if a raft vessel 10 shown in FIG. 2 is filled with the water $1b$ to half the height of the raft vessel 10 and then, for example, a cross-flow water turbine 20 is installed on a central axis C of the raft vessel 10, the flow (current) of the water $1b$ may be converted into rotational energy according to the tipping movement of the raft vessel 10.

The rotational energy may be generated by a generator 40 which is driven by the flow of the water $1b$ coming through the water turbine 20.

Hereinafter, a structure of the raft vessel 10 in a wave power generator according to an exemplary embodiment of the present invention will be provided in detail. In the following description, elements are given with the same numeral references as those for the elements in FIG. 1.

Figure 3A:
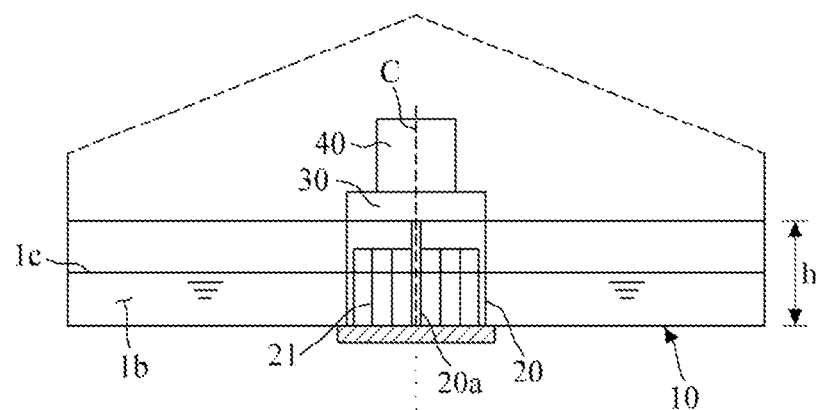
FIG. 3A is a cross-sectional view illustrating FIG. 2 cut by an A-A line.
Figure 3B:
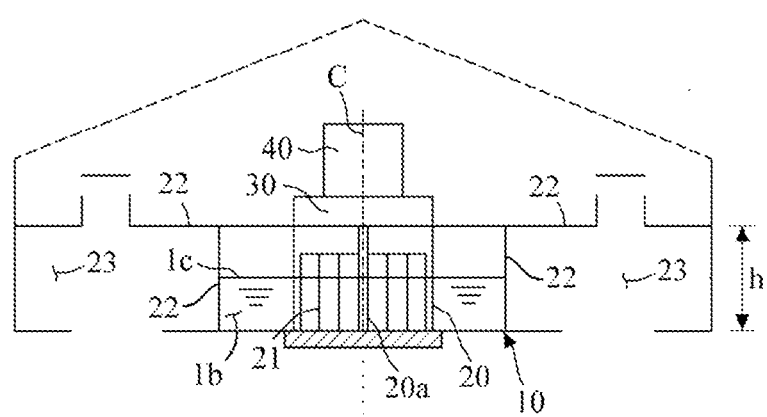
FIG. 3B is a cross-section view illustrating FIG. 2 cut by a B-B line.
Figure 4:
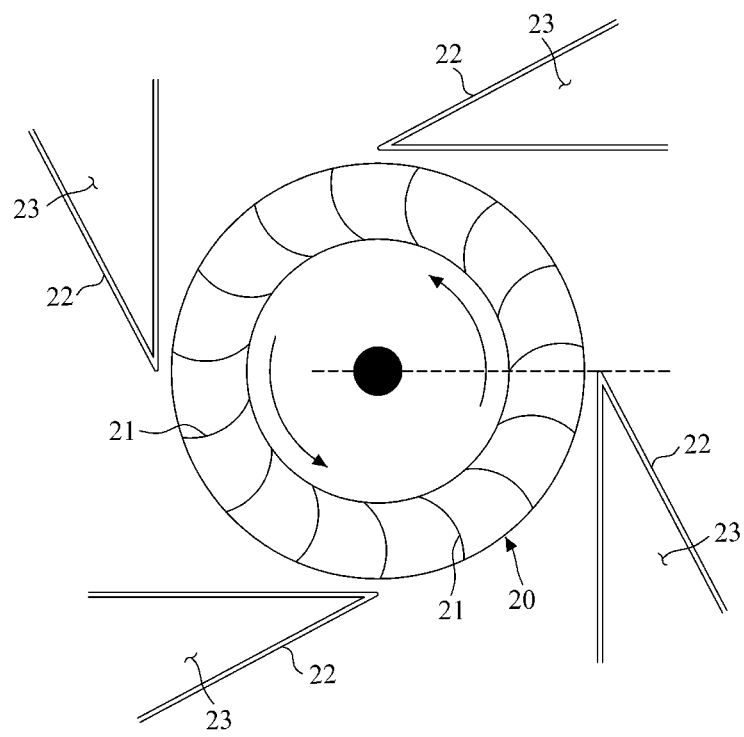
FIG. 4 is a diagram illustrating a water turbine in detail.
Figure 5:
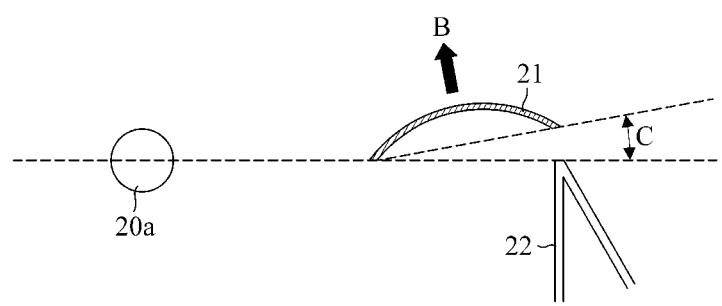
FIG. 5 is a diagram illustrating a deflected blade angle to a central rotation shaft and effects led by having the deflection angle.

FIG. 2 is a diagram illustrating a planar structure of a raft vessel in a wave power generator according to an exemplary embodiment of the present invention; FIG. 3 is a cross-sectional view of FIG. 2 cut by a A-A line; FIG. 4 is a diagram illustrating in detail a configuration of a cross-flow water turbine; and FIG. 5 is a diagram illustrating a deflected angle of each blade and effects led by having the deflection angle.

Referring to FIGS. 2 to 5, a wave power generator according to an exemplary embodiment of the present invention includes a raft vessel 10 filled with water $1b$, a water turbine 20 installed on a central axis C of the raft vessel 10, and a mooring chain 50 connected to the raft vessel 10 to thereby determine a location where the raft vessel 10 is to float.

The raft vessel 10 is an object floating on a sea surface where the wave power generator according to the exemplary embodiment of the present invention is installed. The raft vessel 10 may be a container having a predetermined volume, and may be made of small-mass or lightweight materials.

In general, wave irregularly flows in every direction, rather than in the same direction, and the raft vessel 10 moves on the sea surface according to a wave direction. For this reason, the raft vessel 10 needs to have a structure which allows conversion of wave energy into electricity in response to wave action from every direction. Such a structure will improve power generation efficiency.

To this end, the raft vessel 10 is configured to be in the shape of disk, not a commonly-used square container or square block.

Being configured in the shape of disk, the raft vessel 10 is able to adaptively convert wave power into electricity by responding to wave action from every direction. Thus, the raft vessel 10 in the shape of disk is significantly advantageous in energy efficiency for power generation.

The raft vessel 10 is filled with the water 1b approximately to half the height of the raft vessel 10. For example, an optimized width and/or radius d (See FIG. 2) of the raft vessel 10 for the tipping movement is half a designed wavelength, and a height h (See FIG. 3) of the raft vessel 10 may be determined to be twice a designed wave height. However, aspects of the present invention are not limited thereto.

The water turbine 20 is installed at the center of the raft vessel 10 which floats (moves) due to a wave. In the above-mentioned embodiment, the water turbine 20 is a one way cross-flow water turbine with high efficiency, which is shaped as a sirocco fan. However, the water turbine 20 is not limited thereto, and other water turbines may be utilized.

The water turbine 20 is installed at the center of the raft vessel 10, so that the central rotation shaft 20a of the water turbine 20 coincides with the central axis C of the raft vessel 10.

If the water turbine 20 is installed at the center of the raft vessel 10, the tipping movement downward to the left or the right of the raft vessel 10 makes the water 1b flow and, in turn, the flow of the water 1b makes the water turbine 20 rotate to possibly induce generation of rotational energy. Coming through a transmission 30, the rotational energy drives the generator 40 to thereby generate power (electricity).

Desirably, blades 21 to be arranged in the water turbine 20 need to be designed, taking into consideration an angle at which each blade 21 is tilted. That is, it is desirable that each blade 21 is designed to have a specific structure at a specific angle, to thereby be smoothly rotated in response to the flow of the water 1b.

A deflection angle of each blade 21 and effects led by having the deflection angle are described in detail in the following with reference to FIG. 5. The partitions 22 divide the flow of the water 1b into four paths flowing into the turbine 20 at an arbitrary angle, and the blade 21 is tilted at a deflection angle (C) relative to a central rotation shaft 20a of the water turbine 20 such that a rotational force B is generated related to the arbitrary angle. In addition, the blade 21 desirably has a curved cross section in order to enhance rigidity and improve rotation efficiency of the blade 21.

That is, in this embodiment of the present invention, the blades 21 arranged in the water turbine 20 are at equiangular intervals along the circumference, and have a curved cross section, that is, a cross section in the shape of arc. In particular, a surface of each of the blades 21, where the water of the water 1b strikes, is configured to be concaved to thereby improve a rotational force of the water turbine 20.

In addition, inducing the flow of the water 1b to the center of the raft vessel 10, where the water turbine 20 is installed, is as important as adjusting a deflection angle of the blades 21, in order to increase the rotation efficiency of the water turbine 20.

If the flow of the water 1b is induced to the center of the raft vessel 10, where the water turbine 20 is installed, the water turbine 20 may rotate more effectively, so that more power may be generated.

In this embodiment of the present invention, in order to induce the flow of the water 1b toward the center of the raft vessel 10, where the water turbine 20 is installed, partitions 22 are installed around the central rotation shaft 20a of the water turbine 20 along a circumference of the water turbine 20, thereby forming a plurality of chambers, for example, four chambers.

The partitions 22 makes the flow of the water 1b induced to the center of the raft vessels 10, where the water turbine 20 is installed.

The partitions 22 form air chambers 23, and each air chamber 23 has a closed upper surface and an open bottom surface for surplus buoyancy and absorption with the sea surface. The above configuration helps the raft vessels 10 to remain in a stable state, rather than being overthrown. In addition, the partitions 22 structurally enhance rigidity of the raft vessels 10.

Preferably, the air chambers 23 occupy less than 30 percent of the entire cross section of the raft vessel 10. In addition, air pressure in each of the air chambers 23 may be adjusted using an air compressor.

Due to the above structural characteristics, the wave power generator in this exemplary embodiment of the present invention is able to convert water energy of the water 1b in the raft vessel 10 into rotational energy of the water turbine 20. Therefore, unlike conventional wave power generators which utilize a reaction force between adjacent raft vessels (not illustrated), the wave power generator described above is capable of energy conversion using a single raft vessel 10 which freely floats in spite of being connected to the mooring chain 50.

In particular, the wave power generator is highly efficient in energy conversion, because the wave power generator converts energy of the water, equal to or greater than 800 times that of the air, into rotational energy of the cross-flow water turbine 20. In addition, the wave power generator has the raft vessels 10, each raft vessel whose cross section is almost circular in order to properly respond to irregular wave action from all directions for the purpose of energy conversion.

The wave power generator described above has the simplest structure among all wave power generators. In addition, the wave power generator is able to designate a location where the raft vessel 10 is to float, by using one mooring chain 50 to which a weight 60 may be attached.

In addition, as the wave power generation neither leads to land occupation nor requires a great amount of investment, the chances of industrializing wave power are high. Furthermore, if the cross-flow water turbine 20 with further improved performance and less manufacturing cost is developed, the wave power generation may become the most economical energy generation.

Seasonal variability in the output power is a problem with the wave power generation, but the same problem occurs in wind and solar power generation, as well.

Many countries, such as Korea, lack fossil fuels and have islands and coastal area where residents depend on power supplied from the main land. It means that a domestic wave power industry is promising. In addition, such countries may export a wave power generation technology to under-developed countries which have many islands and a significant amount of wave power resources. Furthermore, a reduced version of the present invention may be applied in an independent and unmanned ocean observing system and a navigation display system.

According to the above exemplary embodiment of the present invention, a simple structure helps the wave power generator to become significantly cost-efficient, boast a high energy conversion rate, and be able to be installed in anywhere, so that the wave power generator may be much more practical and valuable as a clean energy resource.

The following equation is used to expect real power output using measurement results.

| Equation |
| --- |
| Kinetic Energy P of Flowing Fluid = $0.5 \times p \times Q \times V^2 = 0.5 \times p \times A \times V^3$ <br> Flow Velocity V in Fluid Passage = $1.00/n \times R^{2/3} \times S^{1/2}$ |

P: Energy (kw)
p: Fluid density (1 for Water)
H: Waterfall Height (m)
Q: Flux ($m^3$/sec)
V: Flow Veltocity (m/sec)
A: Projected Area of turbine ($m^2$)
n: Surface Function of Flow (0.013 for coated steel)
R: Hydraulic Radius (m)
S: Degree of Inclination of Fluid Passage In the above Equation, flux and flow velocity greatly influence energy. In addition, the flow velocity may be affected by a degree of inclination of a fluid passage, a cross section of the fluid passage, and smoothness of a wetted part in the fluid passage.

With a wave period of 6 seconds, a wave height of 1.5 m, a wave length of 30 m, and wave energy of 7 kw/m, —Standard of a Raft Vessel (in the Shape of Disk Having a Width of 15 m Which is Half the Wave Length)— size of the raft vessel: D15M×H3 m
    bottom area: 15×15×3.14/4=176.62 $m^2$
    water storage: 176.62×1.5=264.93 $m^3$ (30% of the volume remains empty for buoyancy)
    flux passing a center: 264.93×0.7×12=92.7 $m^3$ (flux between wave cycles)

—Expected power output—

A flow velocity of water flowing inside of a raft vessel due to a wave force may be greater than the flow velocity of water moving from one edge of the raft vessel to the other edge during a wave period according to inclination of the raft vessel due to wave height. However, the flow velocity according to the inclination of the raft vessel is not counted for the sake of convenience:

cross-sectional area of flow in a water turbine: radius 2 m×height 1.5 m=3 $m^2$
    flux: 92.7/6(sec)=15.45 $m^3$/sec
    flow velocity: 15.45/3=5.15 m/sec
    flow energy: 0.5×1×15.45×$5.15^2$=204.88 (kw)

Considering efficiency of a water turbine, an accelerator and a generator, real power output (expected) is turned out to be 204.88×0.6×0.9×0.9=99.57 kw, that is, approximately 100 kw. Given a wave force (7 kw/m×15 m) in coastal areas, the result is deemed appropriate.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can provide a wave power generator which has a simple structure leading to improved cost efficiency and high energy conversion rate and is able to be installed in anywhere, so that practicality and a value of wave as a clean energy resource may be enhanced.

The invention claimed is:

1. A wave power generator comprising:
a raft vessel configured in a shape of disk and filled with water;
a water turbine installed on a central axis of the raft vessel; and
a plurality of partitions arranged around a central rotational shaft of the water turbine along a circumference of the raft vessel to form a plurality of chambers and to induce a flow of the water to a center of the raft vessel, wherein the plurality of partitions form air chambers, each air chamber having a closed upper surface and an open bottom surface.

2. A wave power generator comprising:
a raft vessel configured in a shape of disk and filled with water;
a water turbine installed on a central axis of the raft vessel;
a mooring chain configured to be connected to the raft vessel to determine a location where the raft vessel is to float; and
a plurality of partitions arranged around a central rotational shaft of the water turbine along a circumference of the raft vessel to form a plurality of chambers and to induce a flow of the water to a center of the raft vessel, wherein the plurality of partitions form air chambers, each air chamber having a closed upper surface and an open bottom surface.

3. A wave power generator comprising:
a raft vessel configured in a shape of disk and filled with water;
a water turbine installed on a central axis of the raft vessel; and
four vertical partitions arranged around a central rotational shaft of the water turbine along a circumference of the raft vessel to induce a flow of the water to the shaft of the water turbine and to form four air chambers to improve floating of the raft vessel, wherein each air chamber has a closed upper surface and an open bottom surface.

* * * * *